(12) United States Patent
Poe

(10) Patent No.: US 11,467,346 B2
(45) Date of Patent: Oct. 11, 2022

(54) OPTICAL FIBER ADAPTER WITH SHUTTER ASSEMBLY

(71) Applicant: Google LLC, Mountain View, CA (US)

(72) Inventor: Charles Poe, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/161,819

(22) Filed: Jan. 29, 2021

(65) Prior Publication Data

US 2022/0221653 A1    Jul. 14, 2022

Related U.S. Application Data

(60) Provisional application No. 63/137,198, filed on Jan. 14, 2021.

(51) Int. Cl.
*G02B 6/35* (2006.01)
*F21V 8/00* (2006.01)
*G02B 6/38* (2006.01)

(52) U.S. Cl.
CPC ........... *G02B 6/353* (2013.01); *G02B 6/0093* (2013.01); *G02B 6/3825* (2013.01)

(58) Field of Classification Search
CPC ..... G02B 6/0093; G02B 6/353; G02B 6/3825
See application file for complete search history.

(56) References Cited

U.S. PATENT DOCUMENTS

| | | | |
|---|---|---|---|
| 6,685,365 B2 | 2/2004 | White | |
| 6,866,424 B2 | 3/2005 | Tanaka et al. | |
| 7,654,749 B2 | 2/2010 | Lu | |
| 8,821,031 B2 | 9/2014 | Lin et al. | |
| 8,851,763 B2* | 10/2014 | Lin | G02B 6/3825 385/75 |
| 8,936,400 B2 | 1/2015 | Jibiki et al. | |
| 9,196,997 B2 | 11/2015 | Sanders et al. | |
| 9,618,715 B1* | 4/2017 | Yang | G02B 6/4296 |
| 9,632,256 B2 | 4/2017 | Yang et al. | |
| 9,933,586 B1 | 4/2018 | Yang | |
| 10,451,812 B2 | 10/2019 | Verheyden | |
| 10,502,903 B1 | 12/2019 | Wang et al. | |
| 10,725,246 B1* | 7/2020 | Liu | G02B 6/3806 |
| 2013/0064517 A1 | 3/2013 | Lin et al. | |
| 2013/0071068 A1 | 3/2013 | Lin | |
| 2013/0084041 A1 | 4/2013 | Lin et al. | |
| 2015/0117820 A1 | 4/2015 | Lin et al. | |
| 2016/0306121 A1 | 10/2016 | Yang et al. | |

OTHER PUBLICATIONS

Partial European Search Report for European Patent Application No. 21185956.6 dated Dec. 20, 2021. 12 pages.
Extended European Search Report for European Patent Application No. 21185956.6 dated Mar. 21, 2022. 11 pages.

* cited by examiner

*Primary Examiner* — Daniel Petkovsek
(74) *Attorney, Agent, or Firm* — Lerner, David, Littenberg, Krumholz & Mentlik, LLP

(57) ABSTRACT

A shutter assembly for a dual polarity fiber optic adapter is provided. The shutter assembly disposed in the dual polarity fiber optic adapter may eliminate dust accumulation and obstruct light beams emission, thus preventing eyes from a user from exposure to the light beams. Furthermore, an extending tab formed in the dual polarity fiber optic adapter may also prevent misplacement of fiber optic connector during installation.

19 Claims, 12 Drawing Sheets

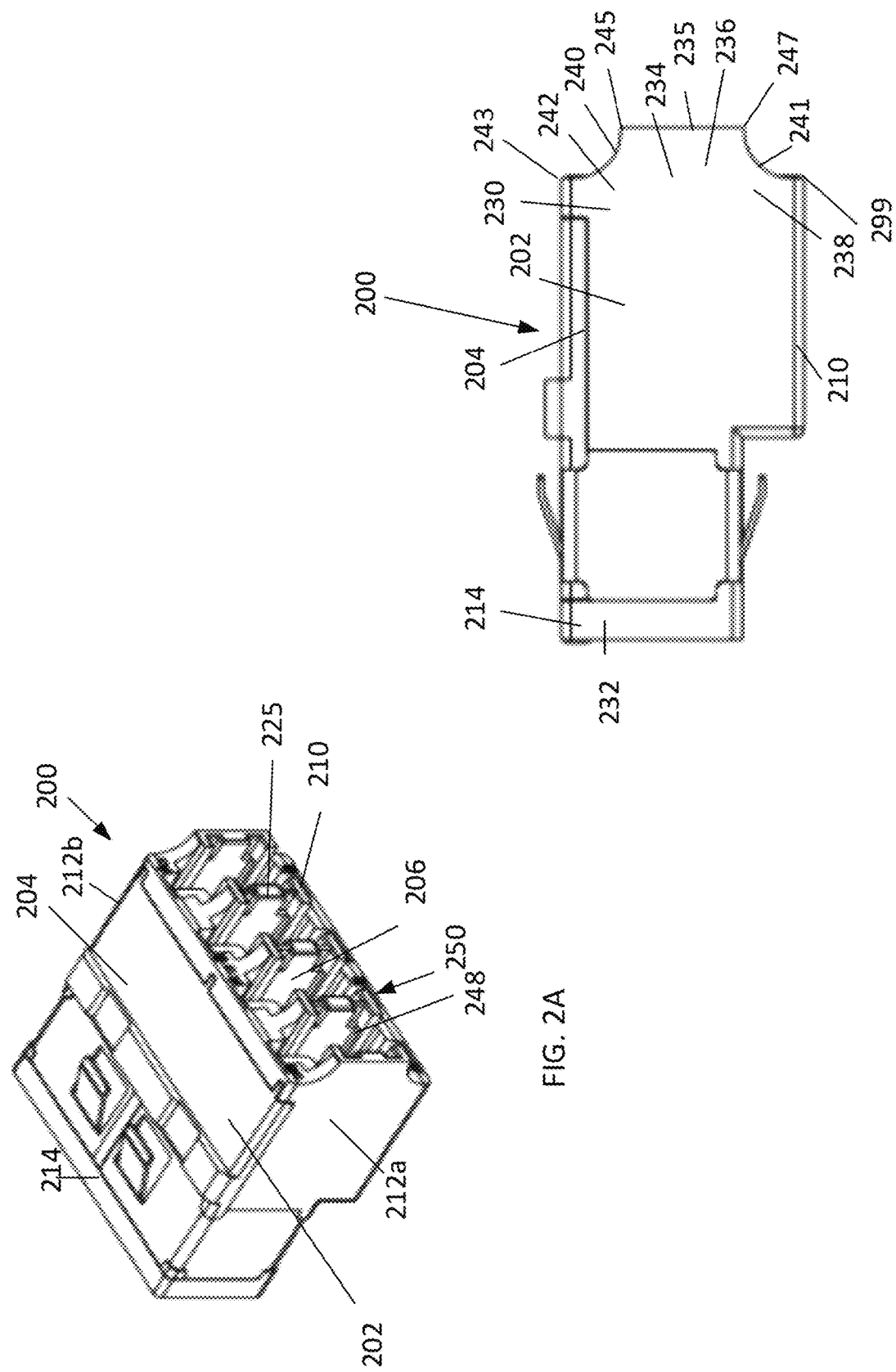

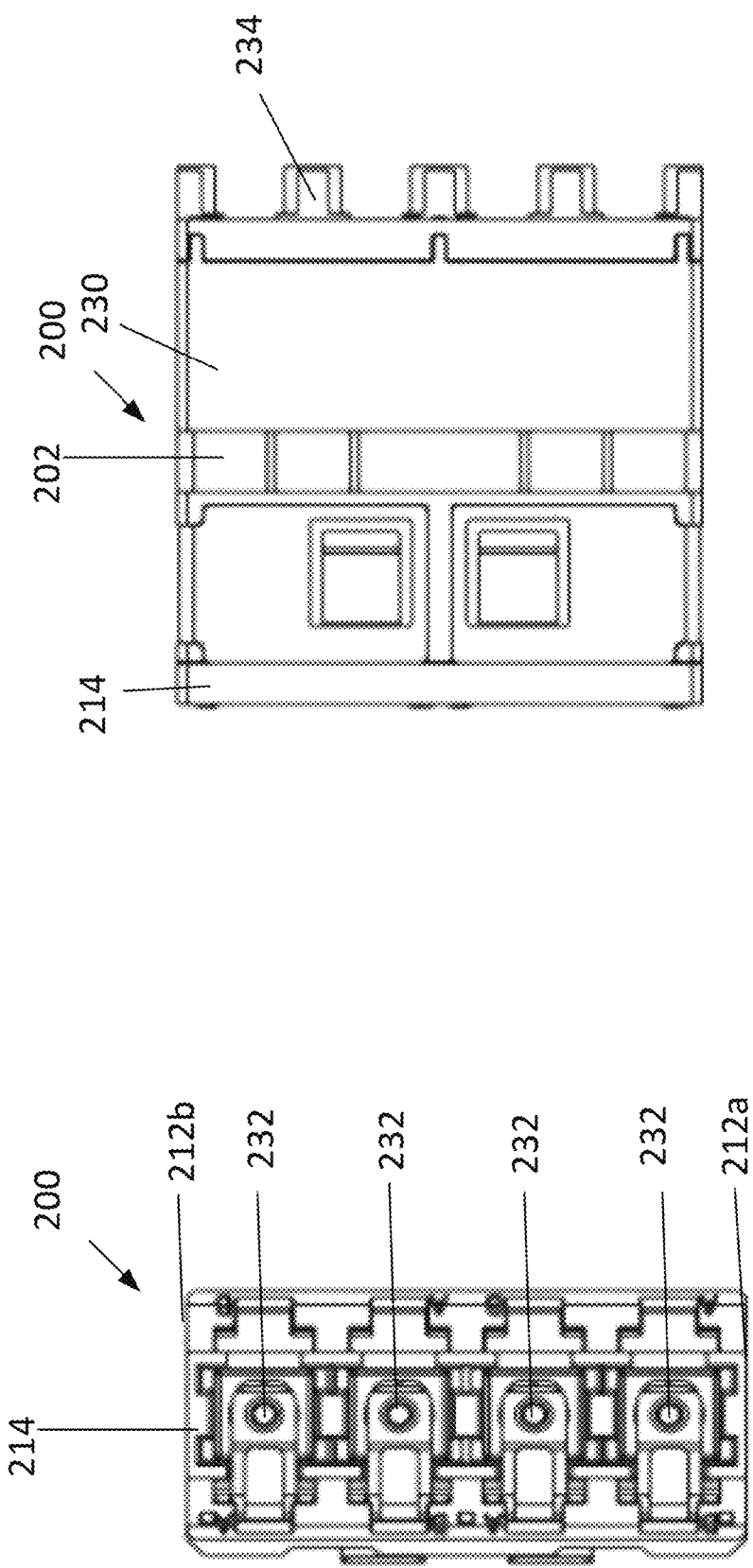

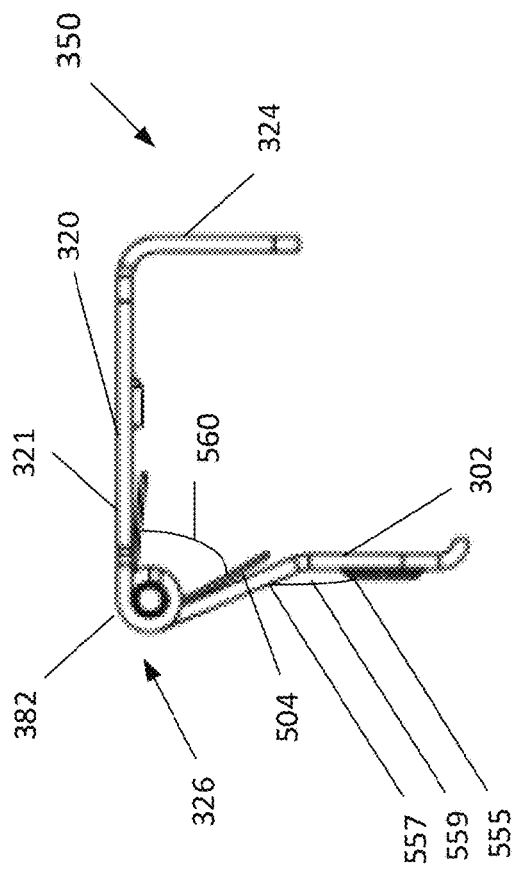
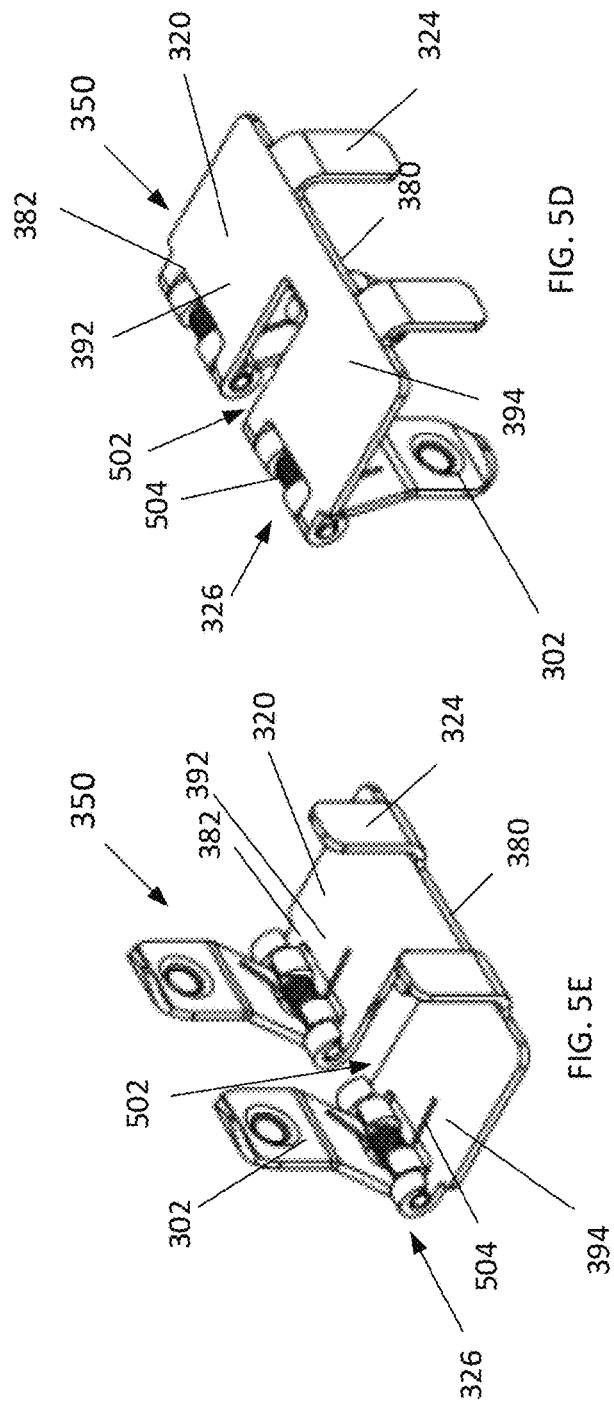

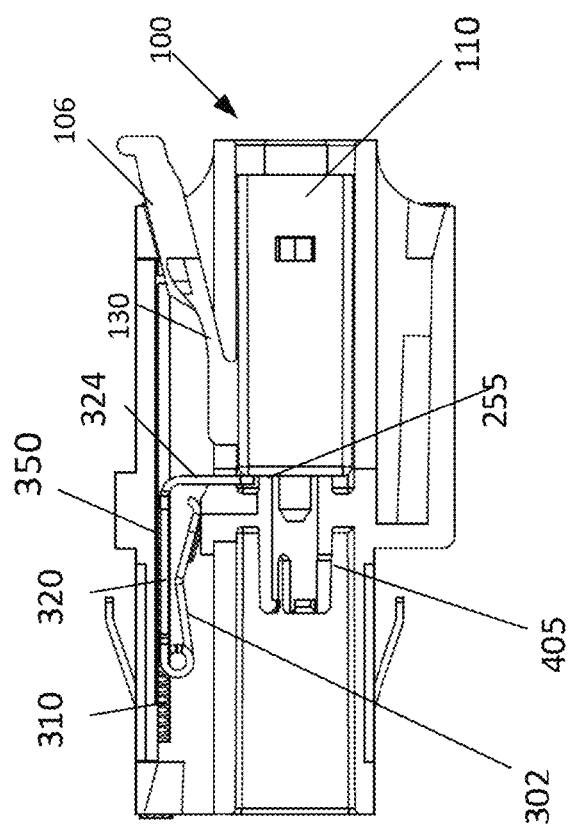
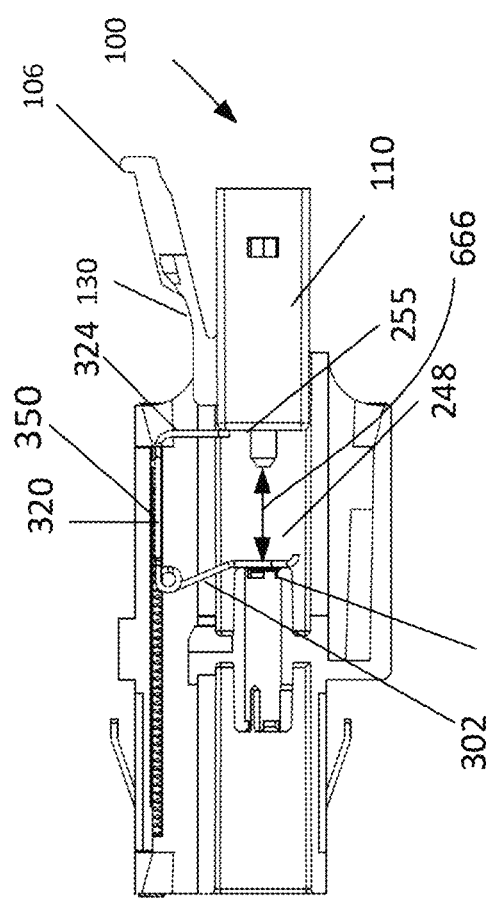
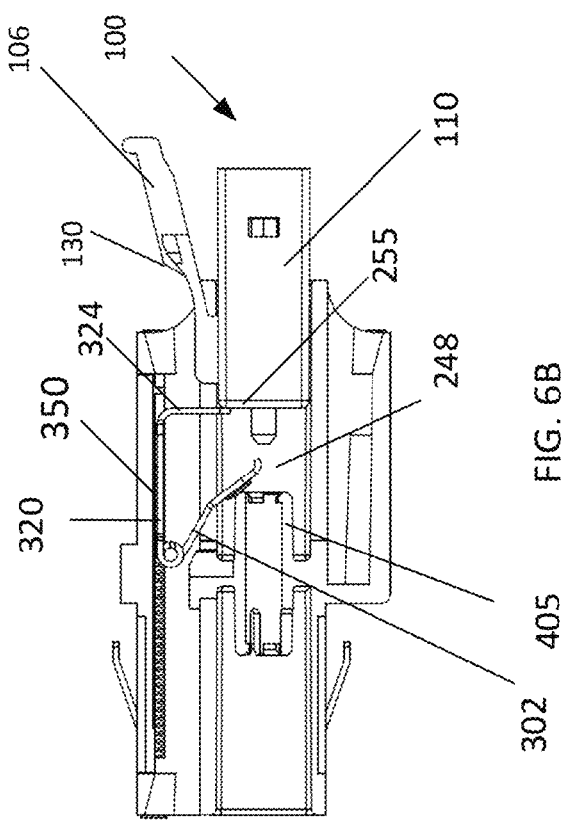

OPTICAL FIBER ADAPTER WITH SHUTTER ASSEMBLY

CROSS-REFERENCE TO RELATED APPLICATIONS

The present application claims the benefit of the filing date of U.S. Provisional Patent Application No. 63/137,198 filed Jan. 14, 2021, the disclosure of which is hereby incorporated herein by reference.

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables, or fiber optic cable with connectors are connected to a fiber optic adapter mounted in a panel assembly disposed in a cable management rack located in a data center or a server room. The fiber optic adapter provides cable-to-cable fiber optic connections and manages the polarity of fiber optic cable connections. The fiber optic adapters are mounted to a cassette or a face plate on a tray that may be further mounted to the panel assembly. The tray may be extended from the panel assembly like a drawer to allow technicians or operators to access the fiber optic components, connectors, or fiber optic cables connected to the fiber optic module, without removing the fiber optic module from the panel assembly.

When a fiber optic connector is disconnected from the fiber optic adapter, a light beam originally propagating from the fiber optic connector may inadvertently be directed into the eye of a technician or other person and may therefore cause damage to the person's eyes or vision. Furthermore, removing the fiber optic connector from its respective fiber optic adapter may also allow dust and contaminants to reach an end face of the ferrule, resulting in damage or signal degradation.

BRIEF SUMMARY

A shutter assembly for a fiber optic adapter is provided. The shutter assembly may be disposed in a dual polarity optic fiber adapter that may receive fiber optic connectors with different polarities. The shutter assembly may eliminate dust accumulation and obstruct light beam emissions from unintentionally exiting the fiber optic adapter when the connector is removed. In one example, the fiber optic adapter includes a housing comprising a top wall, a bottom wall and sidewalls defining an interior cavity. A shutter assembly is disposed in the interior cavity of the housing. The shutter assembly includes a base plate and one or more shutter doors pivotally coupled to a first side of the base plate through a respective hinge assembly. Each shutter door is disposed in parallel and spaced apart horizontally. One or more engagement plates are coupled to a second side of the base plate. Each engagement plate is configured to horizontally face a respective shutter door of the one or more shutter doors.

In one example, a biasing member is disposed in the interior cavity configured to abut against a channel defined in the base plate. The channel is defined between a first portion and a second portion of the first side of the base plate. The first portion is coupled to a first shutter door of the one or more shutter doors and the second portion is coupled to a second shutter door of the one or more shutter doors.

In one example, the engagement plate is configured to engage with a fiber optic connector when the fiber optic connector is connected in the fiber optic adapter. The engagement plate is moved laterally toward the respective shutter door to pivotally lift up the respective shutter door when engaging with the fiber optic connector. The biasing member exerts a force pushing the engagement plate against the fiber optic connector when the fiber optic connector is connected in the fiber optic adapter. The fiber optic connector is a dual polarity fiber optic connector. The engagement plate is configured to engage with an end surface of the fiber optic connector.

In one example, each shutter door is pivotally movable between a first position substantially vertical to the base plate and a second position substantially parallel to the base plate. Each of the one or more shutter doors is in contact with an inner structure when in the first position.

In one example, one or more connector connection ports are formed in the interior cavity. Each connector connection port is configured to receive one of the one or more shutter doors and its respective engagement plate in the connector connection port. The base plate is disposed on a partition wall defined in the housing bridging between the one or more connector connection ports. The biasing member rests on a passage defined on a top surface of the partition wall.

The present disclosure further provides a fiber optic adapter include a housing including a top wall, a bottom wall and sidewalls defining an interior cavity. At least two connector connection ports are disposed in the interior cavity. Each connector connection port is configured to receive a dual polarity connector. A shutter assembly is disposed in the interior cavity. The shutter assembly includes a base plate and a pair of shutter doors coupled to a first side of the base plate. Each shutter door is disposed in a respective connector connection port of the at least two connector connection ports. Each shutter door is pivotally coupled to the first side of the base plate through a hinge assembly. A pair of engagement plates is coupled to a second side of the base plate. Each engagement plate is horizontally aligned with a respective shutter door disposed in the respective connector connection port.

In one example, an interior partition wall is defined between the at least two connector connection ports. A passage is formed on a top surface of the interior partition wall configured to receive a biasing member. A channel is formed in the base plate configured to abut against the biasing member. The base plate is disposed across the at least two connector connection ports.

In on example, an extending tab is formed on one of the sidewalls extending outward from the housing. The shutter door is pivotally movable between a first position substantially vertical to the base plate and a second position parallel to the base plate.

The present disclosure further provides a fiber optic adapter includes a housing comprising a top wall, a bottom wall and sidewalls defining an interior cavity. At least two pairs of connector connection ports are disposed in the interior cavity. Each connector connection port is configured to receive a dual polarity connector. A partition wall is defined between each pair of the connector connection ports. An extending tab disposed on the partition wall extending outward from the housing. A shutter assembly is disposed in each pair of the connector connection ports.

BRIEF DESCRIPTION OF THE DRAWINGS

FIGS. 2A-2D depict an example of a fiber optic adapter according to aspects of the disclosure.

FIGS. 5A-5E depict an example of a shutter assembly disposed in the fiber optic adapter of FIGS. 2A-2D according to aspects of the disclosure.

FIGS. 6A-6C depict cross sectional views of different stages of connecting a fiber optic connector to a fiber optic adapter according to aspects of the disclosure.

DETAILED DESCRIPTION

This disclosure provides a shutter assembly for a fiber optic adapter that may eliminate dust accumulation and obstruct unintended light beam emissions that can be harmful to human eyes. In one example, the shutter assembly is configured to be disposed in a dual polarity fiber optic adapter that may receive fiber optic connectors with different polarities. The shutter assembly includes a shutter door that may be actuated and biased when engaged with a fiber optic connector. An engagement plate is configured to be engaged with the fiber optic connector when the fiber optic connector is inserted in the adapter. When the fiber optic connector is inserted into the dual polarity fiber optic adapter, a sufficient actuating force is applied to overcome a biasing force from a biasing member with which the shutter door is engaged. The actuating force pushes the engagement plate laterally and inwardly to swing or rotate the shutter door from an unbiased position, such as a closed position, to a biased position, such as an opened position. The shutter assembly is disposed in an internal cavity defined in the dual polarity adapter. The dual polarity adapter includes multiple slots defined in a connector connection port. The multiple slots are configured to mate with a fiber optic connector with any polarity configuration, such as standard, straight, or reversed polarity configurations. Thus, the need for ordering different types of adapters with different polarity configurations and fiber management system to mate with the fiber optic connectors with different polarity configurations may be eliminated. Furthermore, the dual polarity fiber optic adapter with the shutter assembly may also eliminate dust accumulation and likelihood of damage to eyes of a user.

Figure 1A:
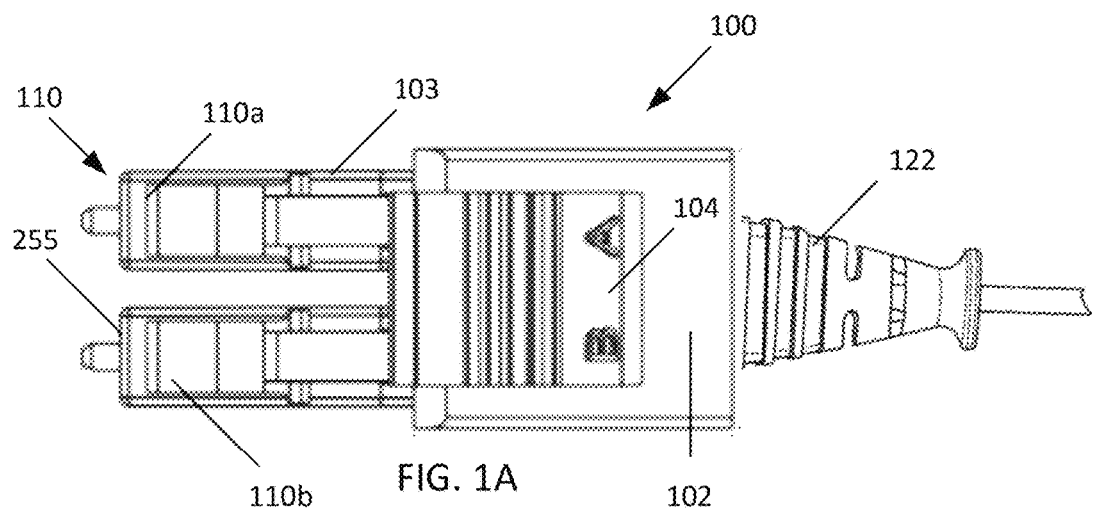
FIGS. 1A-1C depict an example of a fiber optic connector according to aspects of the disclosure.
Figure 1B:
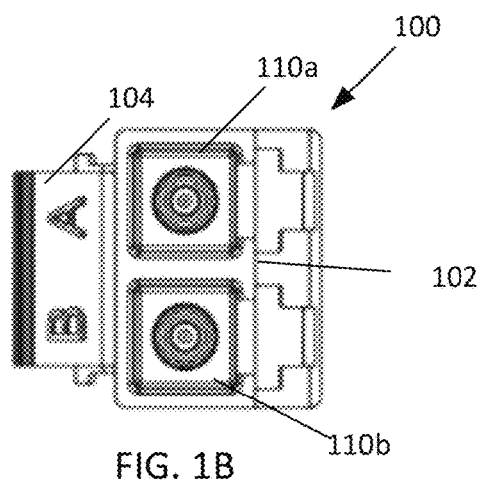
Figure 1C:
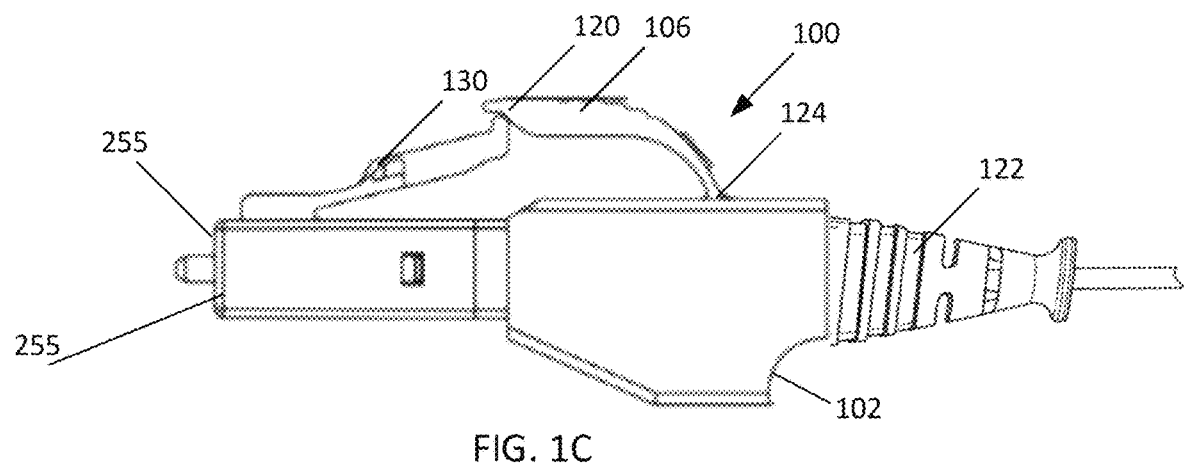

FIGS. 1A-1C depict an example of a fiber optic connector 100 that provides dual polarity configurations. FIG. 1A depicts a top view of the fiber optic connector 100. The fiber optic connector 100 comprises a body 102 that has two ferrules 110a, 110b connected thereto. While two ferrules 110 are shown in the example depicted in FIGS. 1A-1C, it should be understood that additional or fewer ferrules may be included in the connector 100.

FIG. 1B depicts a front view of the fiber optic connector 100 illustrating the two ferrules 110a, 110b formed at a front section 103 of the fiber optic connector 100. An end surface 255 of each ferrule 110 is configured to mate with an inner structure defined in an adapter when inserted in the adapter for light beam transmission. Connector polarity indicia 104 is formed in the body 102 that indicates the polarity of the connector 100. The body 102 encases two optical fibers connecting to the two ferrules 110a, 110b respectively. The two optical fibers enclosed in the body 102 are connected to a cable 122 connected to the body 102.

FIG. 1C depicts a side view of the fiber optic connector 100. A latch 106 has a first end 120 connected to the ferrules 110a, 110b through a spring latch arm 130 and a second end 124 connected to the body 102. The latch 106 is used to secure the fiber optic connector 100 to an adapter. The spring latch arm 130 releasably engages the latch 106. The spring latch arm 130 may be pressed to disengage from the latch 106. When the spring latch arm 130 is released and disengaged from the latch 106, the ferrules 110a, 110b may be inserted into an adapter in a predetermined insertion direction. The adapter may be disposed in a chassis (not shown) mounted in a fiber management system. The latch 106 abuts against the spring latch arm 130 connected to the ferrules 110a, 110b for manually pressing the latter to move downwardly to allow disengagement between the ferrules 110a, 110b and the adapter, and removal of the ferrules 110a, 110b out of the port. When a reversal of the polarity configuration is desired, the spring latch arm 130 may be pressed to discharge the connector assemblies 110a, 110b from the body 102. The ferrules 110a, 110b may then be flipped and rotated for 180 degrees for polarity reversal and the latch 106 will then be re-attached to the opposite site of the body 102. Details of the adapter that may be utilized to mate with the fiber optic connector 100 with dual polarity is illustrated Figure below in detail with references to FIGS. 2A-4.

FIGS. 2A-2D depict a perspective view, a side view, a rear end view and a top view, respectively, of an adapter module 200 in accordance with an example of the present disclosure. The adapter module 200 includes a plurality of adapters 250. The adapter 250 is a dual polarity adapter that may accommodate different orientations and geometrical configurations of the fiber optic connector 100 with different polarity configurations. In the example depicted in FIG. 2A, the adapter module 200 includes four adapters 250 connected together, such as in a line or stack, so as to save space and maximize the usage of the space among the adapters 250. It is noted that the adapter module 200 may have any number of adapters 250 as needed for different configurations of the patch panel onto which the adapter module 200 will be mounted. For example, the adapter module may include one, two, five, six, or many more adapters. It is noted that the density of fiber interconnection may be maximized by utilizing multiple adapter modules 200 to be disposed side-by-side with multiple arrays. In this manner, the adapter modules 200 are abutting one another in adjacent rows and adjacent columns, thus eliminating wasted space from between adjacent rows and adjacent columns and providing a maximum density of connection adapters 250 for the available opening space in the patch panel. In one example, the adapter module 200 may be configured with any angular configuration to provide any connection orientation angle with respect to the patch panel.

The adapter 250 is configured to mate with a fiber optic connector, such as the fiber optic connector 100 depicted in FIGS. 1A-1C with different polarity configurations. It is noted that the adapter 250 may be mated with other types of the fiber optic connector as needed when the geometric configurations of the fiber optic connector can fit in the slot and/or ports defined in the adapter 250.

In one example depicted in FIG. 2A, the adapter module 200 includes a housing 202 having a top wall 204, a bottom wall 210, a first sidewall 212a, and a second sidewall 212b connecting the top wall 204 and the bottom wall 210. The top wall 204, the bottom wall 210, the first and second sidewall 212a, 212b define an interior cavity 206, such as a passage. The interior cavity 206 of the housing 202 is divided by a plurality of partition walls 225, defining multiple adapters 250 with multiple connector connection ports 248 therein. The partition wall 225 is connected from the top wall 204 to the bottom wall 210. Each connector connection port 248 is configured to receive a fiber optic connector, such as the fiber optic connector 100 depicted in Figure IA-1D. Each adapter 250 defined in the adapter module 200 may be symmetrically identical, and the first and second sidewalls 212a, 212b may also be symmetrically identical, such that upon rotation of the adapter module 200 along with its longitudinal axis, the tops and bottoms are interchangeable.

The adapter 250 may serve as a termination point between an incoming fiber optic cable connected through a rear section 214 of the adapter module 200 and an outgoing fiber optic cable, such as the cable 122 depicted in FIG. 1, connected through the fiber optic connector 100.

Although the example depicted herein has four adapters defined in an adapter module, it is noted that the numbers of the adapters formed, configured in, or connected to form an adapter module may be in any numbers as needed.

The top wall 204, the bottom wall 210, the first and second sidewalls 212a, 212b of the housing 202 as well as the partition walls 225 may be integrally formed as an integral body from a polymeric material, such as molded plastic.

FIG. 2B depicts a side view of the adapter module 200. A front section 230 of the adapter module 200 has the connector connection ports 248, as shown in FIG. 2A, defined therein configured to receive the fiber optic connector 100. The front section 230 of the adapter module 200 has a protruding tab 234 projecting outward from a center portion 236 between a first portion 242 and a second portion 238. The first portion 242 is vertically above the second portion 238 across the center portion 236 when the bottom wall 210 is referenced as a horizontal base surface. The first portion 242 and the second portion 238 each define a first surface 240 and a second surface 241 formed inward from an outer center surface 235 defined by the protruding tab 234.

The first surface 240 may have a curved surface extending from a first tip 245 of the center portion 236 to a top edge 243 of the first portion 242. Similarly, the second surface 241 may have a curved surface extending from a second tip 247 of the center portion 236 to a bottom edge 299 of the second portion 238. The curvature of the first and the second surfaces 240, 241 may be substantially identical and symmetrical. Thus, in one example, the first and the second surface 240, 241 are geometrically identical. The curved surface of the first and the second surfaces 240, 241 may facilitate finger gripping the structures inserted therein, such as engagement or disengagement of a latch from a fiber optic connector from the first portion 242 and the second portion 238. As discussed above, the adapter module 200 has the rear section 214 enclosing multiple cable ports 232 configured to receive the fiber optic cables through additional connector structures as needed.

FIG. 2C depicts a rear end view of the adapter module 200. The cable ports 232 are formed in the rear section 214 of the adapter module 200 defined in each adapter 250. FIG. 2D depicts a top view of the adapter module 200. The rear section 214 and the front section 230 may be interlocked by a locking mechanism. In some examples, the rear section 214 may be removable from the front section 230 or vice versa, for ease of installation. In some examples, the rear and front sections 214, 230 may be permanently secured and connected to each other. In the example wherein only one adapter 250 is utilized, the partition wall 225 may be eliminated and the first portion 242, second portion 238 and the center portion 236 may be formed in the first and the second exterior sidewalls 212a, 212b of the housing 202. Similarly, the protruding tab 234 projecting outward from the center portion 236 between the first portion 242 and the second portion 238 is defined in the first and the second sidewalls 212a, 212b. The first portion 242, second portion 238 and the center portion 236 each horizontally define a first slot, a second slot and a center slot formed therebetween. The slots can receive the fiber optic connector 100 in the similar manner described above.

Figure 3:
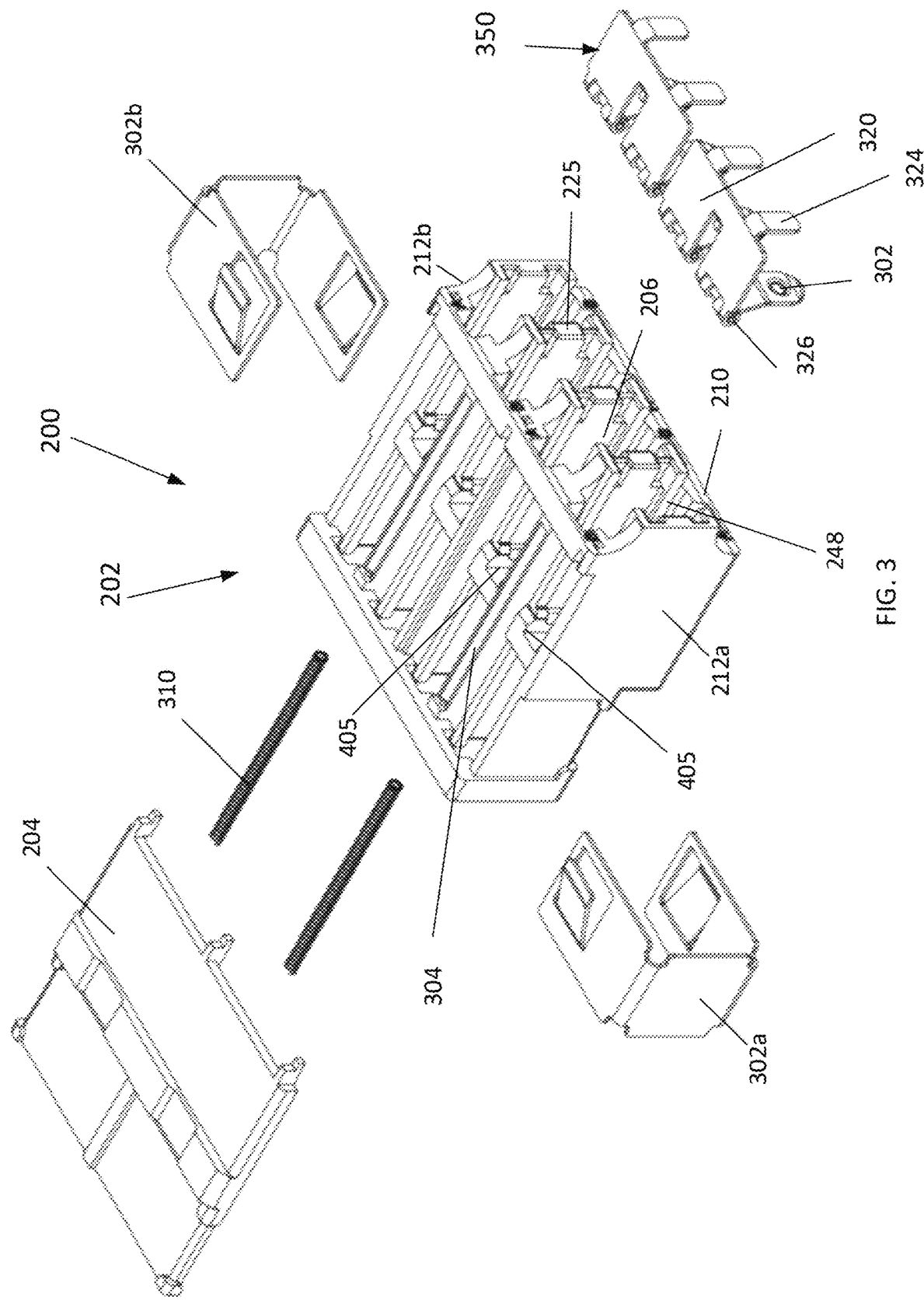
FIG. 3 depicts an exploded view of a fiber optic adapter with a shutter assembly disposed therein according to aspects of the disclosure.

FIG. 3 depicts an exploded view of an example of the adapter modules 200. The plurality of connector connection ports 248 is formed in the interior cavity 206 defined by the partition walls 225. Each partition wall 225 may define a pair of connector connection ports 248 disposed adjacent thereto in the interior cavity 206, such as one connector connection port 248 disposed on each side of the partition wall 225. The top wall 204 may be removably placed on the first and the second sidewalls 212a, 212b. At least two fastening clips 303a, 303b are utilized to secure the top wall 204 on the first and the second sidewalls 212a, 212b and the bottom wall 210. The two side fastening clips 303a, 303b may each be coupled to the first and the second sidewalls 212a, 212b and removable from the adapter modules 200. The two side fastening clips 303a, 303b may facilitate removal of the top wall 204 from the adapter modules 200, or placement of the top wall 204 in the adapter modules 200.

A passage 304 may be formed on a top surface of the partition wall 225. The passage 304 may receive a biasing member 310 disposed on the partition wall 225. In one example, the biasing member 310 may be a compressive spring that exerts a force when being pushed by a shutter assembly 350. The shutter assembly 350 may be disposed in the adapter modules 200 and maybe removable. The shutter assembly 350 may include a plurality of shutter doors 302 configured to be disposed in their respective connector connection ports 248. When the shutter assembly 350 is pushed against the biasing member 310, the shutter doors 302 may be forced to pivotally swing, rotate, lift, or open from a first position, such as a closed position, to a second position, such as an opened position.

In some examples, the shutter assembly 350 generally includes the shutter door 302, an engagement plate 324, and a base plate 320 connected between the shutter door 302 and the engagement plate 324. In one example, a pair of shutter doors 302 and a pair of engagement plates 324 may be disposed on two parallel sides of the base plate 320. The shutter door 302 is configured to be in contact with an inner structure 405 in the adapter module 200 when positioned in the adapter module 200. The inner structure 405 may facilitate light beam transmission when in connection with a connector inserted therein during operation. Details of the shutter assembly 350 will be described below with reference to FIGS. 5A-5E.

In the example depicted in FIG. 3, two pairs of connector connection ports 248 are formed in the interior cavity 206. Each connector connection port 248 is configured to receive the shutter door 302 and its respective engagement plate 324 in the connector connection port 248.

Figure 4:
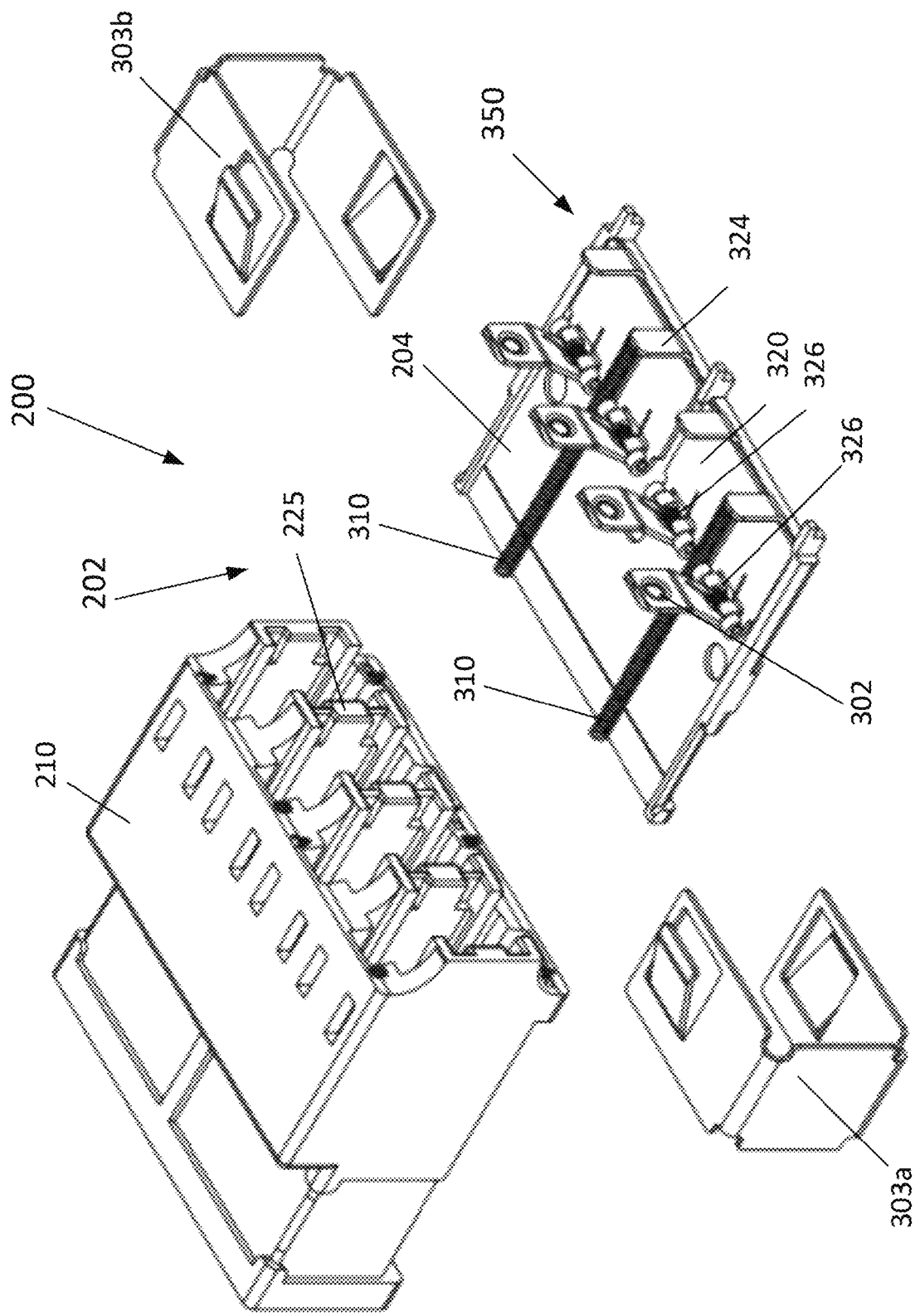
FIG. 4 depicts an exploded view of the fiber optic adapter with the shutter assembly of FIG. 3 with 180° rotation according to aspects of the disclosure.

FIG. 4 depicts an exploded view of an example of the adapter modules 200 of FIG. 3 with 180 degrees rotation, such as a bottom side up view of the adapter modules 200, as opposed to the example depicted in FIG. 3. The shutter assembly 350 is engaged with and abutted against the biasing member 310 when placed on the top wall 204 of the adapter modules 200. As discussed above, each shutter assembly 350 is configured to engage with one biasing member 310 and each of shutter doors 302 and engagement plates 324 of the shutter assembly 350 is configured to be disposed in a respective connection connector port 248 defined by the partition wall 225.

Figure 5B:
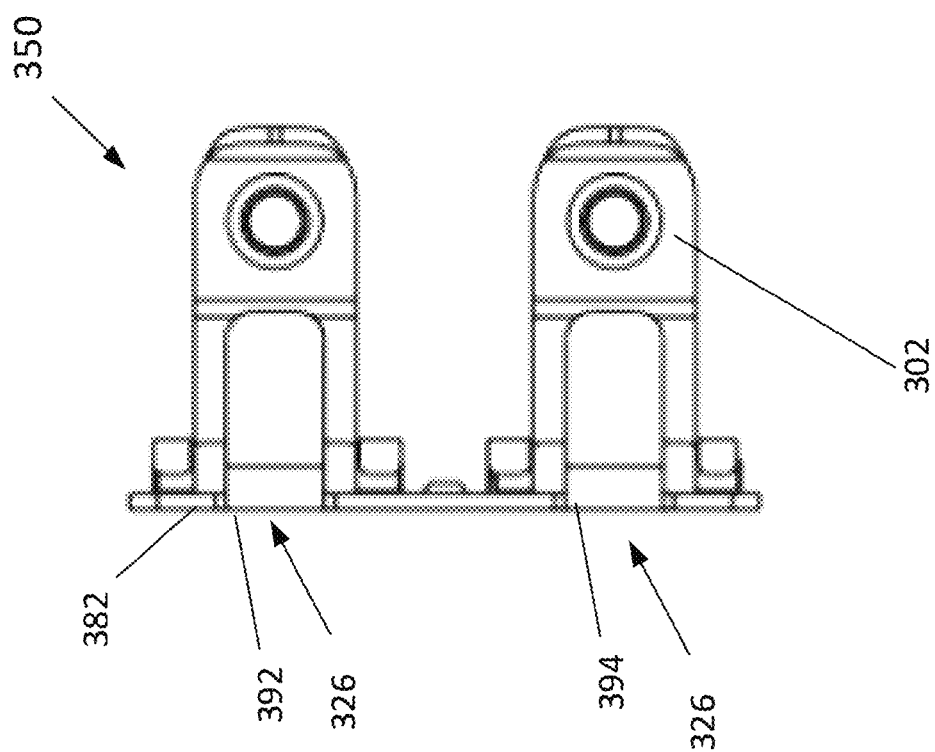
Figure 5A:
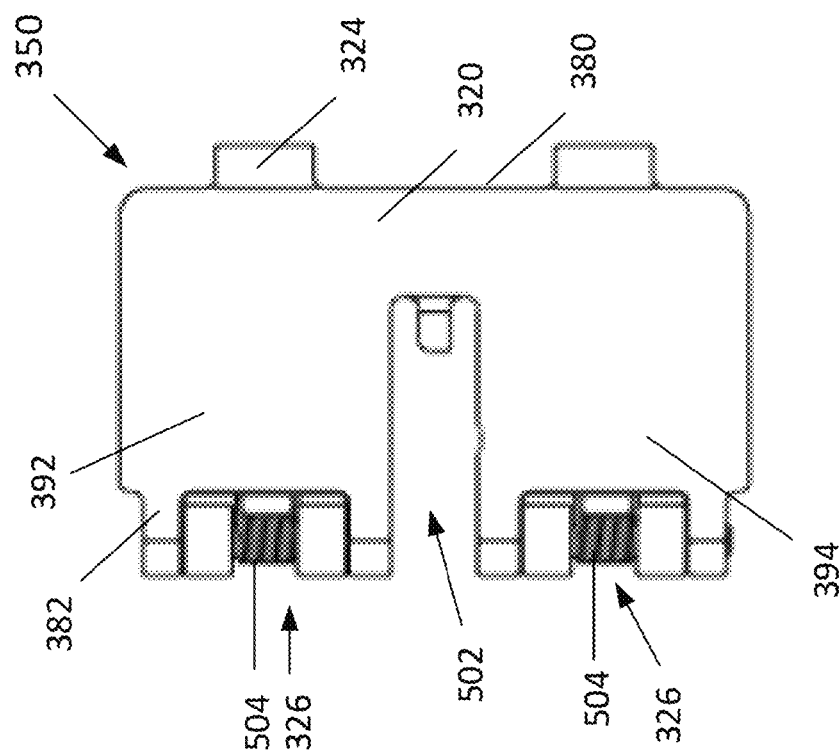

FIGS. 5A-5E depict an example of the shutter assembly 350 that may be disposed in the fiber optic adapter 200 according to aspects of the disclosure. FIG. 5A depicts a top view of the shutter assembly 350. The shutter assembly 350 has a base plate 320 having a first side 382 and a second side 380. The second side 380 may be configured to be substantially parallel to the first side 382. The pair of engagement plates 324 may be attached to the base plate 320 from the second side 380. The pair of the shutter doors 302 is coupled to the base plate 320 through a hinge assembly 326 on the first side 382. The hinge assembly 326 may include a hinge spring 504 that may force the shutter door 302 to be pivoted from a closed position to an opened position when actuated to mate with a connector, such as the fiber optic connector 100 depicted in FIG. 1. Thus, the shutter door 302 is capable of obstructing the light beam emission when in its closed position.

A channel 502 is defined in the first side 382 of the base plate 320. The channel 502 may be substantially formed at a center point of the first side 382, dividing the first side 382 into a first portion 392 and a second portion 394. The first portion 392 and the second portion 394 may each receive one shutter door 302 through the hinge assembly 326. The channel 502 is sized to receive the biasing member 310 to be inserted therein.

FIG. 5B depicts a bottom view of the shutter door 302 coupled to the first side 382 of the base plate 320. Each shutter door 302 of the pair of the shutter doors 302 may be coupled to the first and the second portions 392, 394 through their respective hinge assembly 326 on the first side 382 of the base plate 320.

FIG. 5C depicts a side view of the shutter door 302 coupled to the first side 382 of the base plate 320. Each shutter door 302 of the pair of the shutter doors 302 may be coupled to one of the first and the second portions 392, 394 of the first side 382 through respective hinge assemblies 326. The hinge assembly 326 utilizes the hinge spring 504 to provide an exerting force to pivotally move the shutter door 302 from a closed position to an opened position.

In one example, the shutter door 302 may have an upper part 557 coupled to a lower part 555 at an angle 559. The upper part 557 of the shutter door 302 may be formed at an angle 560 relative to a horizontal surface 321 defined by the base plate 320. The angle 560 formed between the upper part 557 of the shutter door 302 and the horizontal surface 321 defined by the base plate 320 may be determined by the styles or configurations of the hinge spring 504. In one example, the angle 560 is an acute angle less than 90 degrees. Thus, the upper part 557 of the shutter door 302 is tilted or sloped at the angle 560 relative to the base plate 320 while the lower part 555 of the shutter door 302 is formed substantially vertical and/or orthogonal relative to the horizontal surface 321 defined by the base plate 320. As the lower part 555 of the shutter door 302 is configured to be in contact with a connector or an inner structure in the adapter, the substantially vertical configuration of the lower part 555 of the shutter door 302 provides a good fitting and mating surface to the connector or the inner structure. In one example, the angle 559 defined between the upper and lower part 557, 555 of the shutter door 302 may be an obtuse angle greater than 90 degrees.

FIG. 5D depicts a top view of the shutter assembly 350. FIG. 5E depicts a flipped view of the shutter assembly 350 of FIG. 5D with 180 degree rotation. The pair of the engagement plates 324 is disposed on the second side 380 of the base plate 320 while the pair of the shutter doors 302 is disposed on the first side 382 of the base plate 320. Each shutter door 302 is disposed in parallel and spaced apart horizontally from each other. Each shutter door 302 is formed in one of the first and the second portion 392, 394 of the first side 382 of the base plate 320 respectively. The engagement plates 324 are also formed in parallel and spaced apart horizontally from each other, and each engagement plate 324 is configured to horizontally face a respective shutter door 302 of the pair of shutter doors 302. The base plate 320 is configured to be disposed on the partition wall 225 abutting the biasing member 310 disposed on the top surface of the partition wall 225 defined in the housing 202. The base plates 320 bridge between the pair of the connector connection ports 248.

FIGS. 6A-6C depict cross sectional views of different stages of connecting a fiber optic connector, such as the fiber optic connector 100 of FIG. 1, having a first polarity into the fiber optic adapter 250. In the example depicted in FIG. 6A, the fiber optic connector 100 may have a first polarity, such as a straight or standard polarity having the latch 106 and the spring latch arm 130 formed on the top of the ferrule 110. As the adapter 250 utilized in the present disclosure may accumulate and receive fiber optic adapter 250 with dual polarity, the standard positions of the latch 106 and the spring latch arm 130 may be inserted into an upper slot formed in the adapter 250.

As the fiber optic connector 100 is inserted, the end surface 255 of the ferrule 110 may first encounter with the engagement plate 324 of the shutter assembly 350. As the fiber optic connector 100 continues to be pushed in, the engagement plate 324 may continue to be actuated and pushed laterally towards the inner structure 405 defined in the adapter 250, as shown in FIG. 6B. In the meantime, the base plate 320 may also move along with the engagement plate 324, laterally pushing against the biasing member 310. The lateral movement of the base plate 320 causes the shutter door 302 to pivotally swing, move, or lift up in a direction toward the base plate 320, such as a counterclockwise direction from a cross sectional view. In the example depicted in FIG. 6B, the shutter door 302 is half-way lifted up from a vertically position to a sloped position, which is configured to be continued to be rotated toward the base plate 320 as the advancement of the fiber optic connector 100 in the adapter 250. The dimension of the connector connection ports 248 also continues to shrink as the fiber optic connector 100 moves in. As the fiber optic connector 100 eventually reaches to a final position to mate with the inner structure 405, the shutter door 302 is moved up to a position substantially parallel to the base plate 320, as shown in FIG. 6C. The shutter door 302 is lifted up in a folded configuration to be in close proximity to the base plate 320. The biasing member 310 is being pushed and compressed that allows the lateral movement of the shutter assembly 350. When the fiber optic connector 100 is removed from the adapter 250, the biasing member 310, by natural property of a compressive spring, provides an exerting force, pushing the shutter door 302 to be back in its original position, as shown in FIG. 6A, which is a closed position substantially vertical relative to the base plate 320.

Figure 7A:
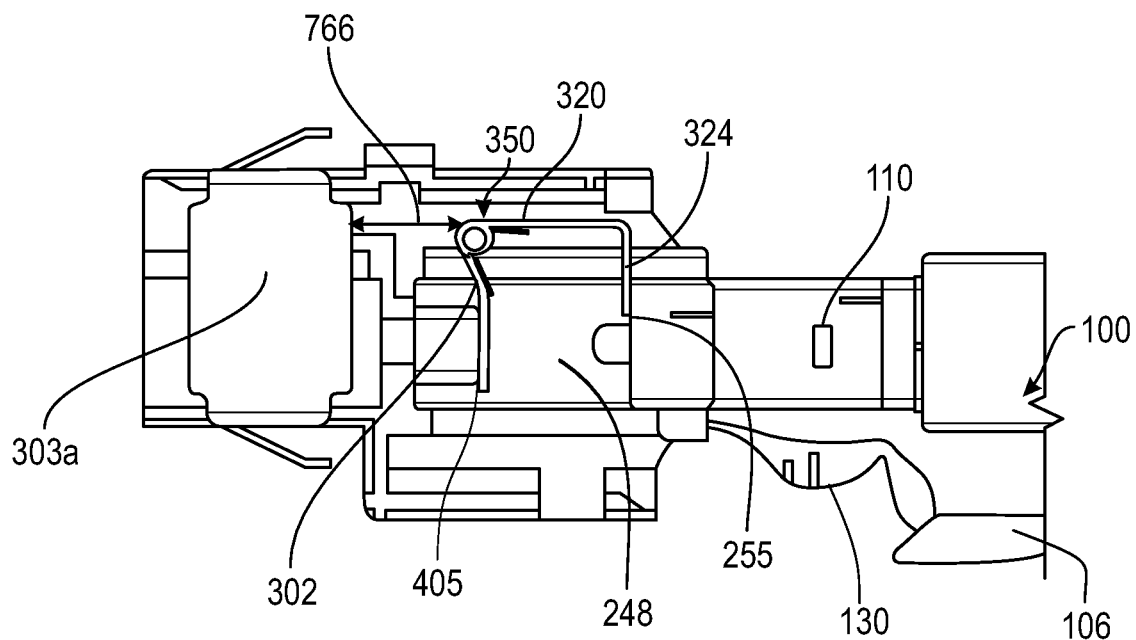
FIGS. 7A-7C depict cross sectional views of different stages of connecting a fiber optic connector with a fiber optic adapter with 180° rotation according to aspects of the disclosure.
Figure 7B:
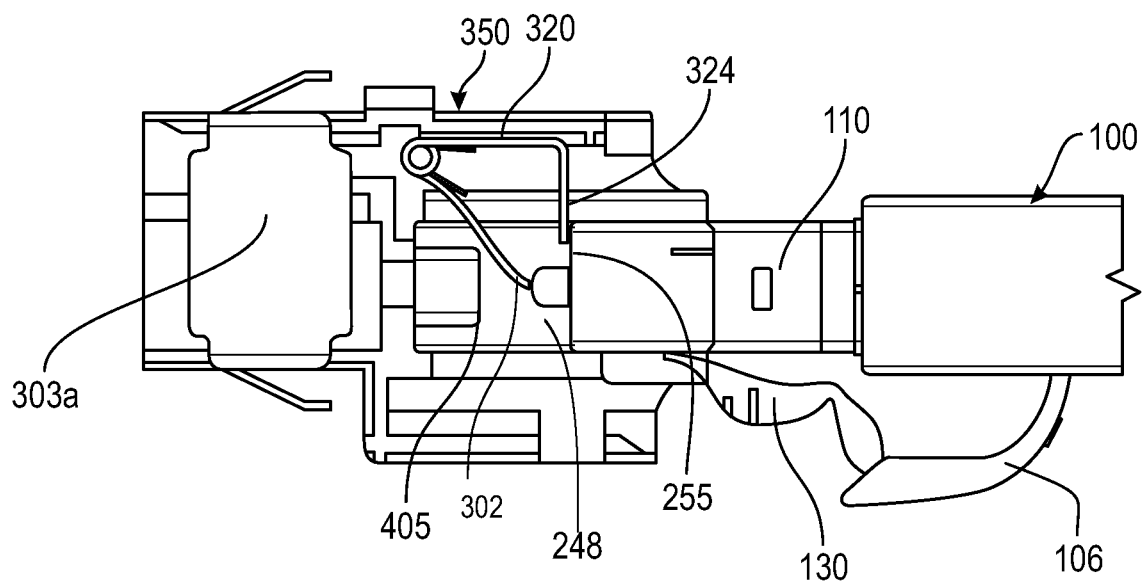
Figure 7C:
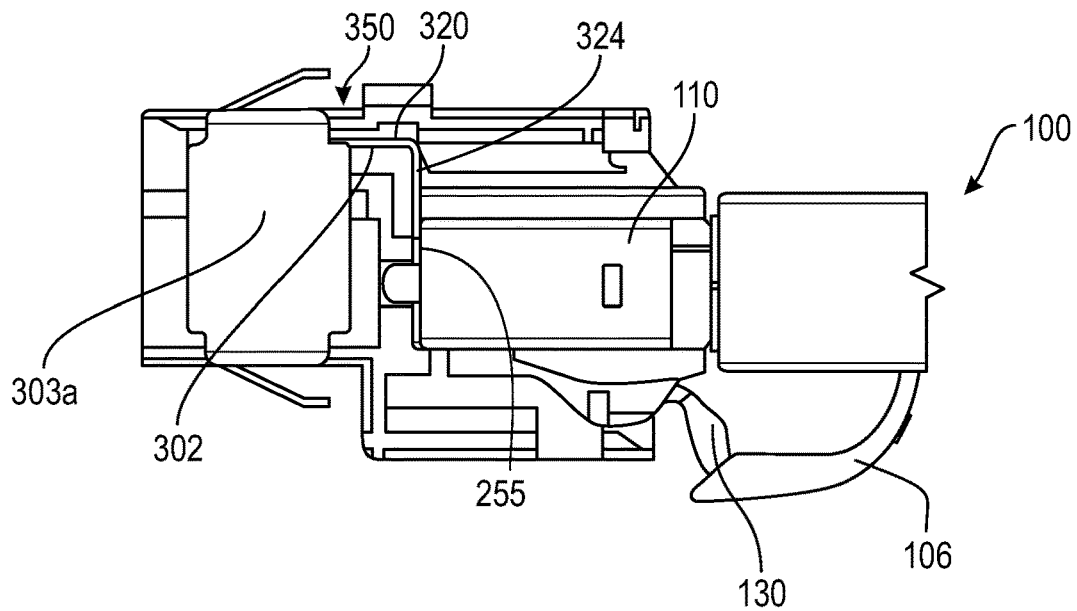

FIGS. 7A-7C depict cross sectional views of different stages of connecting a fiber optic connector, such as the fiber optic connector 100 of FIG. 1, having a second polarity in the fiber optic adapter 250. In the example depicted in FIG. 7A, the fiber optic connector 100 may have a second polarity, such as a reversed polarity having the latch 106 and the spring latch arm 130 formed on the bottom of the ferrule 110. As the adapter 250 utilized in the present disclosure may accommodate and receive fiber optic adapter 250 with dual polarity, the reversed position of the latch 106 and the spring latch arm 130 may be inserted into a lower slot formed in the adapter 250.

As the fiber optic connector 100 is inserted in the adapter 250, the end surface 255 of the ferrule 110 may first encounter with the engagement plate 324 of the shutter assembly 350. As the fiber optic connector 100 continues to be pushed in, the engagement plate 324 may continue to be actuated and pushed laterally towards the inner structure 405 defined in the adapter 250, as shown in FIG. 7B. In the meantime, the base plate 320 may also move along with the engagement plate 324, laterally pushing against the biasing member 310 against which the base plate 320 is abutted. The lateral movement of the base plate 320 causes the shutter door 302 to pivotally swing, move, or lift up in a direction toward the base plate 320. In the example depicted in FIG. 7B, the shutter door 302 is half-way lifted up from a vertical position to a sloped position, which is configured to be continued to be rotated toward the base plate 320. As the fiber optic connector 100 eventually reaches to a final position to mate with the inner structure 405, the shutter door 302 is moved up to a position substantially parallel to the base plate 320, as shown in FIG. 7C. The shutter door 302 is lifted up in a folded configuration to be in close proximity to the base plate 320. The position of the shutter assembly 350 may be laterally pushed in from a first position having a distance 766 away from the fastening clips 303a, as shown in FIG. 7A, to a second position that is substantially encased in the fastening clips 303a, which may not be viewed from the sideview depicted in FIG. 7C. In the example depicted in FIG. 7C, only a tip end of the shutter door 302 may be viewed. The biasing member 310 is being pushed to allow the laterally movement of the shutter assembly 350. When the fiber optic connector 100 is removed from the adapter 250, the biasing member 310, by natural property of a compressive spring, provides an exerting force, pushing the shutter door 302 to be back in its original position, as shown in FIG. 7D, which is the same as the position depicted in FIG. 7A, allowing the shutter door 302 to be back in the original position, which is a closed position substantially vertical relative to the base plate 320.

Figure 8A:
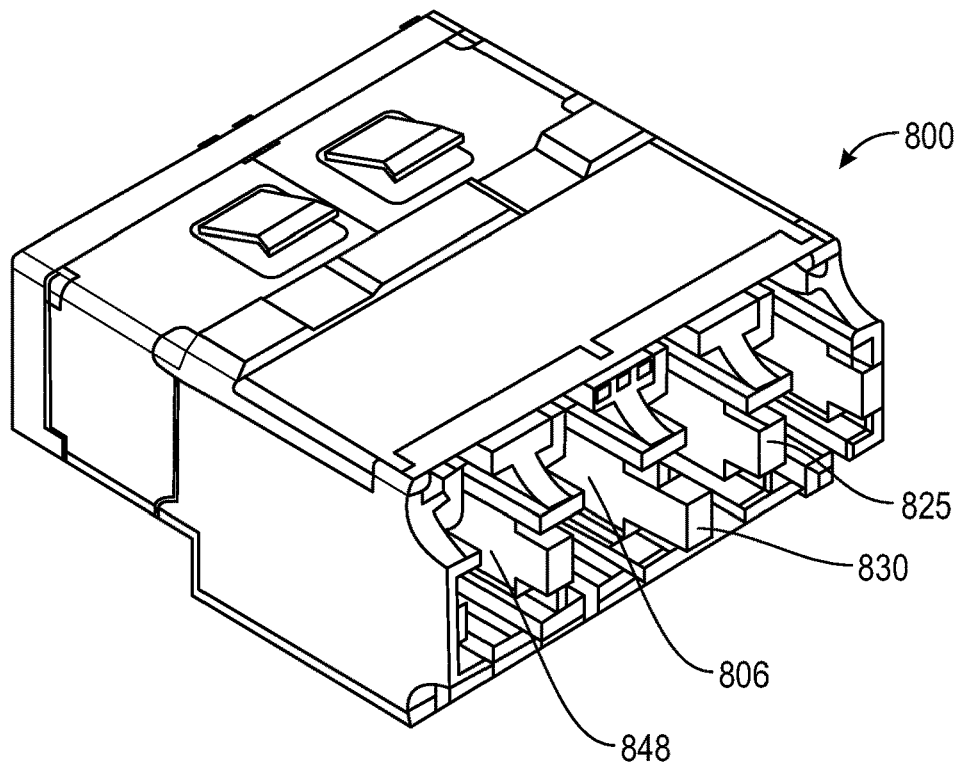
FIGS. 8A-8B depict perspective and top views of a fiber optic adapter having an extending tab formed therein according to aspects of the disclosure.
Figure 8B:
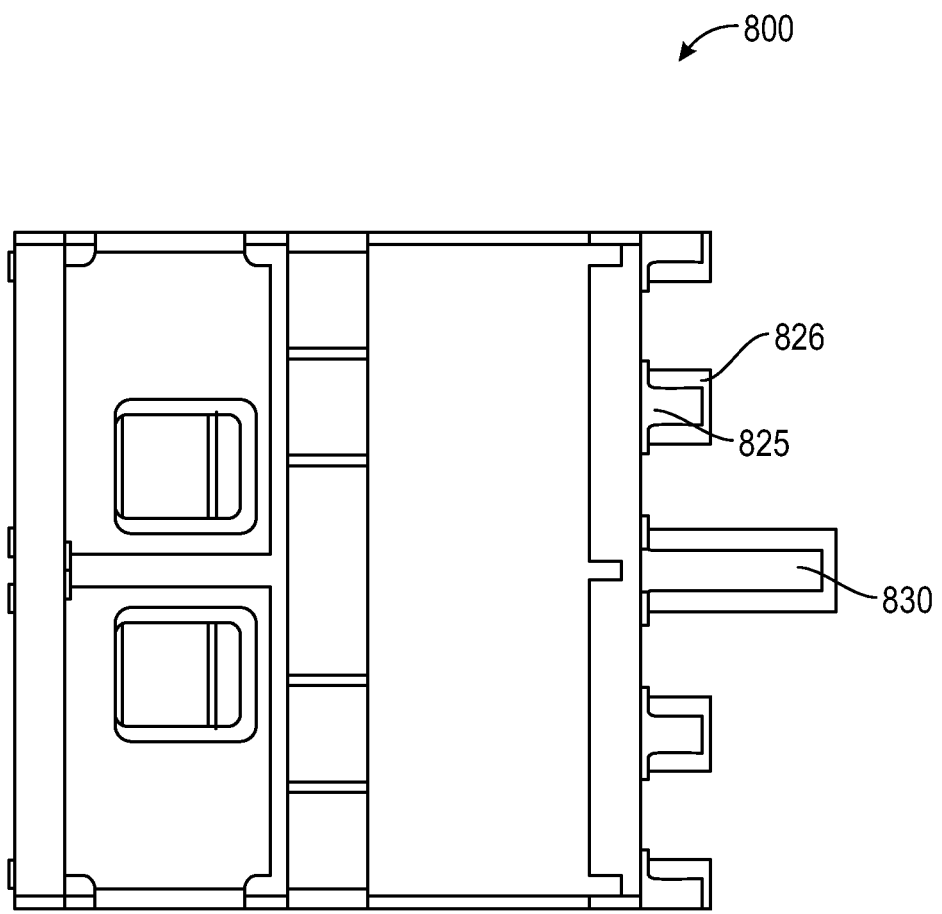

FIGS. 8A-8B depict a top perspective view and a top plain view of another example of an adapter module 800 having an extending tab 830 formed therein. The adapter module 800 is substantially similar to the adapter module 200 described above, except that the extending tab 830 is disposed in an interior partition wall 806. The extending tab 830 may prevent misplacement of the fiber optic connector 100 in the adapter module 800. The extending tab 830 may separate the connector connection ports 848 formed in the adapter module 800 in pairs, thus facilitating easy installation of the fiber optic connector 100 with the pair of ferrules 110a, 110b inserted into its respective pairs of the connector connection ports 848. In one example, the extending tab 830 may be horizontally extended and protruded from a vertical plane 826 defined by the partition wall 825, similar to the partition wall 225 depicted in FIG. 2A.

Figure 9A:
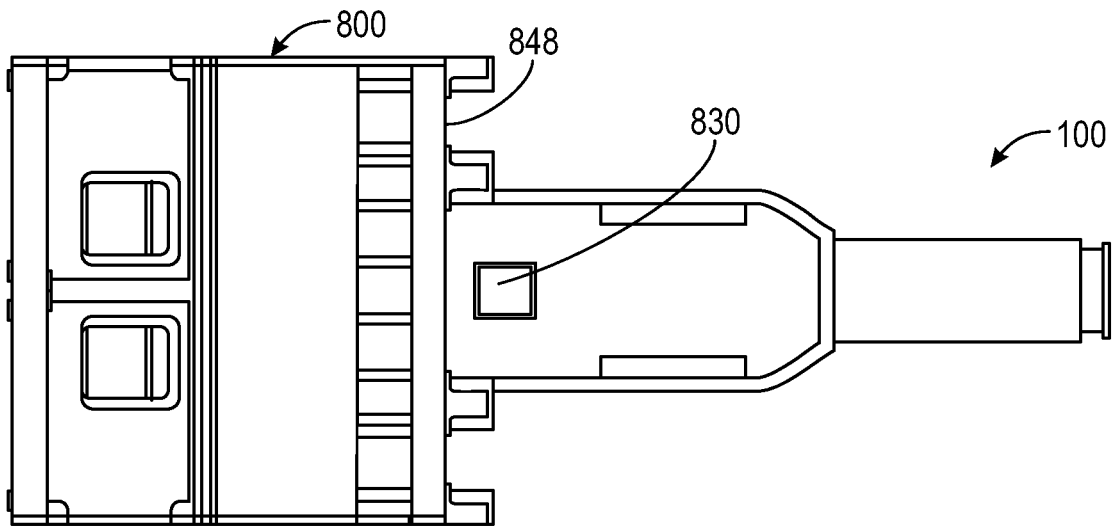
FIGS. 9A-9B depict top views of a fiber optic adapter of FIGS. 8A-8B with and without fiber optic connector misplacement according to aspects of the disclosure.
Figure 9B:
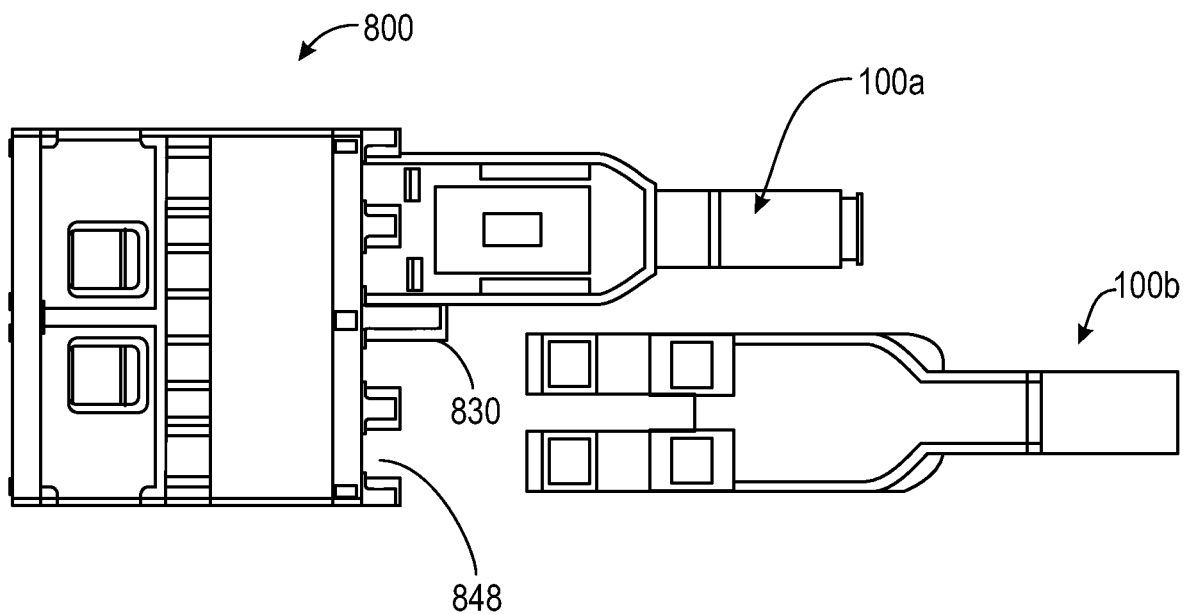

FIG. 9A depicts an example when the fiber optic connector 100 is misplaced in an incorrect position in the adapter module 800. When the fiber optic connector 100 is inserted in the adapter 800, a pair of the connector connection ports 848 are occupied. In the situation when the fiber optic connector 100 is misplaced, the corresponding cable may not be able to be aligned with the designated fiber optic connector 100 with the desired polarity, which may inadvertently interrupt the light beam transmission. Furthermore, misplacement of the fiber optic connector 100 may also result in some connector connection ports 848 being left out and not able to be paired up with its respective fiber optic connector 100, thus resulting in incorrect fiber pairing of the connector connection ports 848 in the adapter module 800. As shown in FIG. 9A, the extending tab 830 formed in the adapter module 800 may prevent and disallow the fiber optic connector 100 to be fully inserted into an incorrect position of the corresponding connector connection ports 848 in the adapter module 800. Thus, a user may easily notice the misplacement as the fiber optic connector 100 cannot be fully inserted into the connector connection ports 848 by the physical obstruction created from the extending tab 830. Thus, the extending tab 830 may serve as a divider that guides the user to insert the fiber optic connector 100 to a desired and corresponding connector connection port 848, as shown in FIG. 9B.

The shutter assembly may eliminate dust accumulation and obstruct light beam emission, thus preventing eyes from a user from exposure to the light beams. The shutter assembly includes a shutter door that may be actuated and biased when actuated by an insertion of a fiber optic connector. The shutter assembly may be disposed in a dual polarity adapter that includes multiple slots configured to receive fiber optic connectors with different polarities, such as standard, a straight, or reversed polarity configurations. The dual polarity fiber optic adapter with the inner shutter assembly may also eliminate dust accumulation and damage to eyes of an end user. Furthermore, an extending tab formed in the dual polarity adapter may also prevent misplacement of the fiber optic connector in the adapter, providing an easy installation with minimum likelihood of mistake creation. Thus, by doing so, the installation efficiency may be improved and accurate cable management may be obtained.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many pos-

The invention claimed is:

1. A fiber optic adapter, comprising:
a housing comprising a top wall, a bottom wall and sidewalls defining an interior cavity;
a shutter assembly disposed in the interior cavity of the housing, the shutter assembly comprising:
a base plate;
one or more shutter doors pivotally coupled to a first side of the base plate through a respective hinge assembly, each shutter door disposed in parallel and spaced apart horizontally; and
one or more engagement plates coupled to a second side of the base plate, each engagement plate configured to horizontally face a respective shutter door of the one or more shutter doors, wherein the engagement plate is configured to be in direct contact with an end surface of a fiber optic connector when the fiber optic connector is connected in the fiber optic adapter.

2. The fiber optic adapter of claim 1, further comprising:
a biasing member disposed in the interior cavity configured to abut against a channel defined in the base plate.

3. The fiber optic adapter of claim 2, wherein the channel is defined between a first portion and a second portion of the first side of the base plate, the first portion coupled to a first shutter door of the one or more shutter doors and the second portion coupled to a second shutter door of the one or more shutter doors.

4. The fiber optic adapter of claim 2, further comprising:
one or more connector connection ports formed in the interior cavity, wherein each connector connection port is configured to receive one of the one or more shutter doors and its respective engagement plate in the connector connection port.

5. The fiber optic adapter of claim 4, wherein the base plate is disposed on a partition wall defined in the housing bridging between the one or more connector connection ports.

6. The fiber optic adapter of claim 5, wherein the biasing member rests on a passage defined on a top surface of the partition wall.

7. The fiber optic adapter of claim 1, wherein the engagement plate is moved laterally toward the respective shutter door to pivotally lift up the respective shutter door when engaging with the fiber optic connector.

8. The fiber optic adapter of claim 1, wherein the biasing member exerts a force pushing the engagement plate against the fiber optic connector when the fiber optic connector is connected in the fiber optic adapter.

9. The fiber optic adapter of claim 1, wherein the fiber optic connector is a dual polarity fiber optic connector.

10. The fiber optic adapter of claim 1, wherein the engagement plate is configured to engage with a front surface of the fiber optic connector.

11. The fiber optic adapter of claim 1, wherein each shutter door is pivotally movable between a first position substantially vertical to the base plate and a second position substantially parallel to the base plate.

12. The fiber optic adapter of claim 11, wherein each of the one or more shutter doors is in contact with an inner structure when in the first position.

13. A fiber optic adapter, comprising:
a housing comprising a top wall, a bottom wall and sidewalls defining an interior cavity;
at least two connector connection ports disposed in the interior cavity, each connector connection port configured to receive a dual polarity connector;
a shutter assembly disposed in the interior cavity, the shutter assembly comprising:
a base plate;
a pair of shutter doors coupled to a first side of the base plate, each shutter door disposed in a respective connector connection port of the at least two connector connection ports and each shutter door pivotally coupled to the first side of the base plate through a hinge assembly; and
a pair of engagement plates coupled to a second side of the base plate, each engagement plate horizontally aligned with a respective shutter door disposed in the respective connector connection port, wherein each of engagement plates is configured to be in direct contact with an end surface of a fiber optic connector when the fiber optic connector is connected in the fiber optic adapter.

14. The fiber optic adapter of claim 13, further comprising:
an interior partition wall defined between the at least two connector connection ports; and
a passage formed on a top surface of the interior partition wall configured to receive a biasing member.

15. The fiber optic adapter of claim 13, further comprising:
a channel formed in the base plate configured to abut against the biasing member.

16. The fiber optic adapter of claim 13, wherein the base plate is disposed across the at least two connector connection ports.

17. The fiber optic adapter of claim 13, further comprising:
an extending tab formed on one of the sidewalls extending outward from the housing.

18. The fiber optic adapter of claim 13, wherein the shutter door is pivotally movable between a first position substantially vertical to the base plate and a second position parallel to the base plate.

19. A fiber optic adapter, comprising:
a housing comprising a top wall, a bottom wall and sidewalls defining an interior cavity;
at least two pairs of connector connection ports disposed in the interior cavity, each connector connection port configured to receive a dual polarity connector;
a partition wall defined between each pair of the connector connection ports;
a passage formed on a top surface of the partition wall;
a biasing member disposed in the passage;
an extending tab disposed on the partition wall protruding outward relative to an outer edge of a top wall of the housing; and
a shutter assembly disposed in each pair of the connector connection ports.

* * * * *